(12) United States Patent
Lopez

(10) Patent No.: US 11,320,838 B2
(45) Date of Patent: May 3, 2022

(54) CONCERTED AUTONOMOUS VEHICLE COLLISION AVOIDANCE

(71) Applicant: Logan A. Lopez, Sarasota, FL (US)

(72) Inventor: Logan A. Lopez, Sarasota, FL (US)

(*) Notice: Subject to any disclaimer, the term of this patent is extended or adjusted under 35 U.S.C. 154(b) by 191 days.

(21) Appl. No.: 16/597,311

(22) Filed: Oct. 9, 2019

(65) Prior Publication Data

US 2021/0109545 A1 Apr. 15, 2021

(51) Int. Cl.
| | | |
|---|---|---|
| *G05D 1/02* | (2020.01) | |
| *G05D 1/00* | (2006.01) | |
| *B60W 30/09* | (2012.01) | |
| *B60W 10/18* | (2012.01) | |
| *B60W 10/20* | (2006.01) | |

(52) U.S. Cl.
CPC .......... *G05D 1/0291* (2013.01); *B60W 10/18* (2013.01); *B60W 10/20* (2013.01); *B60W 30/09* (2013.01); *G05D 1/0055* (2013.01); *G05D 1/0088* (2013.01); *B60W 2400/00* (2013.01); *B60W 2554/00* (2020.02); *B60W 2710/18* (2013.01); *B60W 2710/20* (2013.01); *B60W 2756/10* (2020.02); *G05D 2201/0213* (2013.01)

(58) Field of Classification Search
CPC .................................................. G05D 1/0291
See application file for complete search history.

(56) References Cited

U.S. PATENT DOCUMENTS

| | | | | |
|---|---|---|---|---|
| 10,380,898 B1* | 8/2019 | Schubert | ................ | G08G 1/22 |
| 10,481,614 B2* | 11/2019 | Switkes | ............. | B60W 30/165 |
| 11,172,467 B2* | 11/2021 | Rubin | ................ | H04W 4/027 |
| 2010/0256852 A1* | 10/2010 | Mudalige | ................ | G08G 1/22 |
| | | | | 701/24 |
| 2016/0357187 A1* | 12/2016 | Ansari | ................ | G01S 17/86 |
| 2018/0210462 A1* | 7/2018 | Switkes | ............. | B60W 30/165 |
| 2018/0210464 A1* | 7/2018 | Switkes | ............. | B60W 50/16 |
| 2019/0051188 A1* | 2/2019 | Moustafa | ................ | G08G 1/22 |
| 2019/0084533 A1* | 3/2019 | Kasper | ................ | G08G 1/052 |
| 2019/0084534 A1* | 3/2019 | Kasper | ................ | G08G 1/22 |
| 2020/0064864 A1* | 2/2020 | Franchi | ................ | H04W 48/06 |

OTHER PUBLICATIONS

Martensson, Jonas et al., Evaluation of Safety Distance in Vehicle Platoons by Combined Braking and Steering, KTH Royal Institute of Technology, School of Electrical Engineering, ACCESS Linnaeus Centre, Automatic Control Lab, Stockholm, Sweden (2012).*

* cited by examiner

*Primary Examiner* — Jean Paul Cass

(57) ABSTRACT

A method for providing coordinated steering and braking of a plurality vehicles traveling in a platoon in response to detecting an obstruction in front of the platoon. The method includes detecting the obstruction by at least one of the vehicles in a front row of the platoon and coordinating and verifying between the vehicles in the front row that the obstruction is in front of the platoon. The method also includes broadcasting a message from one of the vehicles in the front row to the other vehicles in the platoon behind the front row that a coordinated braking and steering operation will occur to prevent a collision with the obstruction. The method then causes the vehicles in each row to steer to a breach position and causes the vehicles to brake so that all of the vehicles stop at the sides of the lanes.

15 Claims, 4 Drawing Sheets

CONCERTED AUTONOMOUS VEHICLE COLLISION AVOIDANCE

BACKGROUND

Field

This disclosure relates generally to a system and method for providing coordinated steering and braking of a platoon of vehicles in response to detecting an obstruction in front of the platoon and, more particularly, to a system and method for providing coordinated steering and braking of a platoon of vehicles in response to detecting an obstruction in front of the platoon, where the vehicles in a front row of the platoon identify the obstruction and rows of the vehicles steer in alternating and opposite directions to form a breach position of the vehicles to provide additional braking space.

Discussion of the Related Art

Traffic accidents and roadway congestion are significant problems for vehicle travel. Highway travel at high speeds creates significant risk where a sudden roadway hazard could create a vehicle pileup, possibly resulting in thousands of dollars of damages, many injuries and the increased risk of death as opposed to other forms of roadway crashes. These types of crashes typically occur because of the decentralized nature of driving and the inherent delay and faulty judgment of the drivers.

These and other concerns have led to the operation of modern vehicles becoming more autonomous, i.e., vehicles are able to provide driving control with less and less driver intervention. For example, future vehicles likely will employ autonomous systems for lane changing, passing, turns away from traffic, turns into traffic, etc. Smooth maneuvering and automated lane centering and lane changing control is important for driver and passenger comfort in autonomously driven vehicles. As vehicle systems improve, they will become more autonomous with the goal being a complete autonomously driven vehicle.

Vehicular ad-hoc network based active control and driver assistance systems allow a short-range wireless vehicle communications system, such as a dedicated short range communication (DSRC) system or a WiFi-based wireless communication system, known to those skilled in the art, to transmit messages to other vehicles. DSRC or WiFi can be used to implement wireless-based vehicle features that can improve driver convenience, roadway efficiency, and facilitate many types of in-vehicle services. The DSRC technology enables a new class of vehicle features based on communication with other vehicles. These types of communications protocols can be implemented in vehicle-to-vehicle (V2V) communications networks where the vehicles broadcast messages containing information about the vehicle, such as speed, braking, detected icy roads, etc. that are not directed to any specific vehicle, but are meant to be shared with a vehicle population. One of the most popular uses of V2V communications is in vehicle collision warning systems. For example, in these types of systems where collision avoidance is desirable, as two or more vehicles communicate with each other and report their position, velocity, acceleration and/or braking status and a collision becomes probable, the system can warn the vehicle drivers, or possibly take evasive action for the driver, such as applying the brakes.

Communications security is critical in these applications, since a message with inaccurate information, whether intentional or otherwise, could lead to an accident. Public key cryptography (PKC) is typically used for message authentication in V2V communications networks. In public key cryptography, each user has a pair of cryptographic keys, namely, a public key and a private key. The private key is kept secret, while the public key may be widely distributed. The keys are related mathematically, but the private key cannot be feasibly derived from the public key. In public key cryptography, a digital certificate is an electronic document that uses a digital signature to bind together a public key with an identity, which in the case of a V2V communications network is an identity of a vehicle or individual, or any other attribute that is uniquely associated with the entity. Using digital signatures, a message signed with a sender's private key can be verified by anyone who has access to the sender's public key, thereby proving that the sender had access to the private key, and that the message has not been tampered with. An important requirement of PKC-based security protocols is the transmission of a public key belonging to an entity to a receiver through a secure and authentic channel that prevents another entity from claiming ownership of the public key being transmitted. Digital certificates are employed as a mechanism to enable a secure channel for transmission of public keys authentically.

Autonomously driven vehicles employing V2V communications could benefit from platooning. Platooning is a practice where vehicles (mainly trucks in current practice) are spaced closer together than in normal driving conditions to take advantage of the slipstream created by the leading vehicles. While this allows for greater fuel economy and a faster efficient travel on highways, platooning also increases the general density of the vehicles. This could causes a dangerous situation where an accident or act of god can cause a total obstruction in front of a platoon, and create a catastrophic crash that has more casualties than today's less efficient ad-hoc driving.

There are many companies in today's market attempting to integrate new autonomous features into vehicles to allow for crash avoidance, such as emergency pedestrian stopping, but none currently present any solution for potential large scale crashes. Furthermore, none take advantage of the ability for these vehicles to "swarm", in which they communicate to benefit everyone, in collision situations. Current swarming solutions involve coordinating traffic simply to streamline traffic flow and reduce times for commute.

SUMMARY

The following discussion discloses and describes a system and method for providing coordinated steering and braking of a plurality vehicles traveling in a platoon in response to detecting an obstruction in front of the platoon, where the vehicles are equipped with V2V communications. The method includes causing the vehicles to travel in a normal platoon configuration where the vehicles are arranged so that at least two vehicles travel in parallel travel lanes as a row, where there is a plurality of rows of vehicles and where vehicles traveling in a particular travel lane travel closely behind each other. The method also includes detecting the obstruction by at least one of the vehicles in a front row of the platoon and coordinating and verifying between the vehicles in the front row that the obstruction is in front of the platoon. The method further includes broadcasting a message from one of the vehicles in the front row to the other vehicles in the platoon behind the front row that a coordinated braking and steering operation will occur to prevent a collision with the obstruction. The method then causes the vehicles in each row to steer in one direction to one side of the travel lane they are in such that the vehicles in alternating rows steer in opposite directions to an opposite side of the travel lane they are in so that the vehicles in the alternating rows proceed to opposite sides of the travel lane from each other and not directly behind each other. The method also causes the vehicles to brake so that all of the vehicles stop at the sides of the lanes.

Additional features of the disclosure will become apparent from the following description and appended claims, taken in conjunction with the accompanying drawings.

DETAILED DESCRIPTION OF THE EMBODIMENTS

Figure 1:
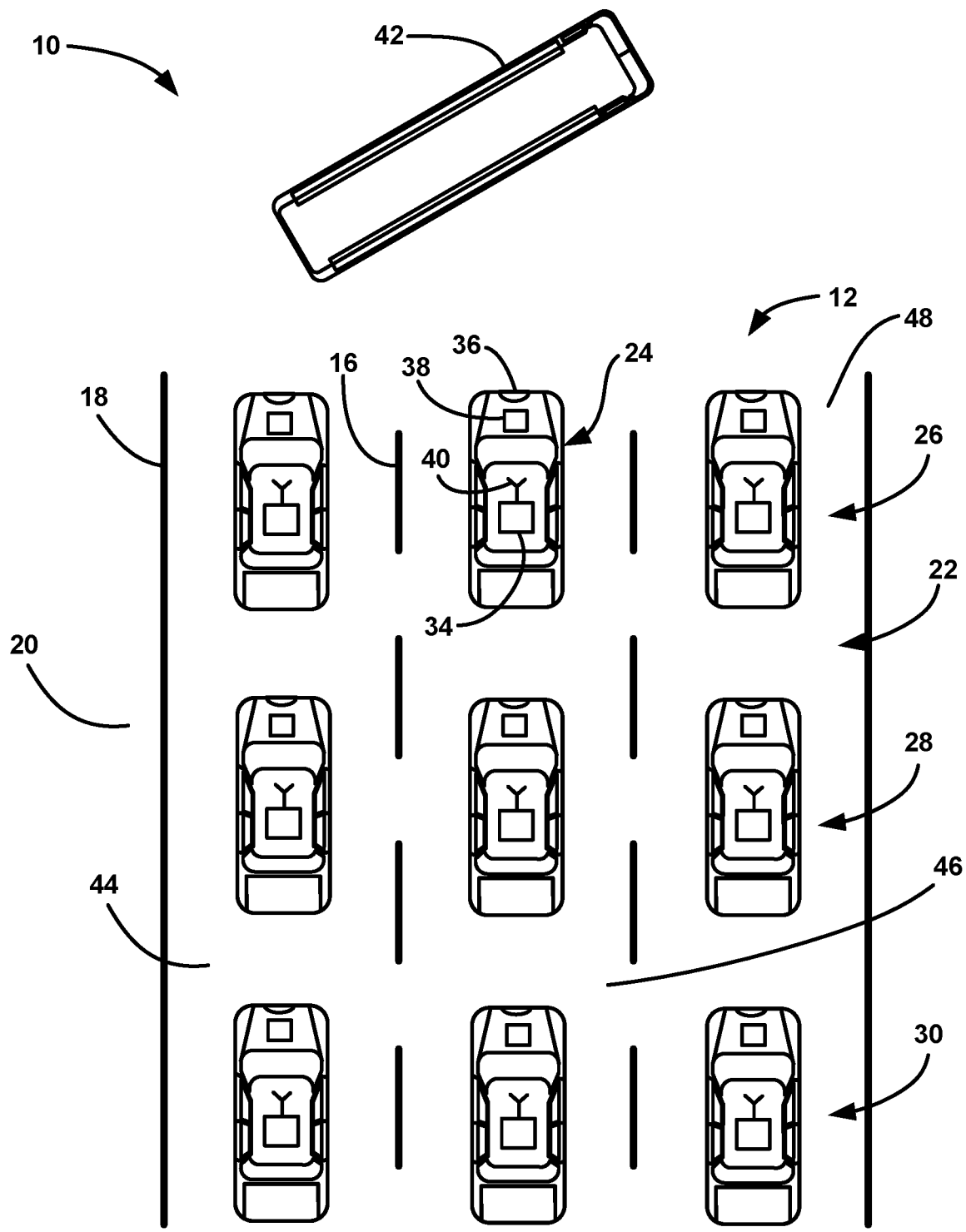
FIG. 1 is an illustration of a platoon of vehicles each having V2V communications and traveling in a plurality of lanes associated with a roadway under normal driving conditions.

The following discussion of the embodiments of the disclosure directed to a system and method for providing coordinated steering and braking of a platoon of vehicles in response to detecting an obstruction in front of the platoon is merely exemplary in nature, and is in no way intended to limit the invention or its applications or uses.

As will be discussed in detail below, this disclosure describes a system and method for providing coordinated steering and braking of a platoon of vehicles in response to detecting an obstruction in front of the platoon that includes causing the vehicles to steer to a "breach position," i.e., a position where there is an opening in front of each vehicle that is not occupied by another vehicle, to maximize the braking distance between the vehicles that gives extra valuable seconds to prevent vehicle collision. The disclosed system and method also combine the breach position with a back-to-front braking sequence of the vehicles in the platoon that also reduces the chance of collisions between the vehicles. With the breach position and back-to-front braking strategy as presented, the likelihood of a vehicle colliding with another vehicle within the platoon is not only minimized, but is limited to the outer edges of the vehicle, thus providing more protection to passengers in the event of a collision.

Modern highways often include a paved, prohibited travel shoulder that has rumble strips to alert drivers when they veer off of the roadway, which the breach position can use. These shoulders usually allow for the full width of a vehicle, and are sometimes used by left lane drivers when a vehicle suddenly stops in front of them, where they move to the shoulder to avoid rear ending the vehicle ahead. Instead as a concerted effort, the vehicles will take advantage of anti-lock braking systems (ABS) that allows the vehicle to slow down, but keep maneuvering. Starting from the front of the platoon the vehicles can then space out to fill this shoulder to equalize the space between the vehicles and aligned to one side. The row of vehicles behind will do the same thing, but will be aligned to the opposite side and continue on for the platoon of vehicles. This ends up creating a tessellated pattern of the vehicles, which provides two advantages. Specifically, because the vehicles are not directly front to back it lessens the damage from front and rear collisions with other vehicles, and extends the time for deceleration and spacing between the vehicles to prevent a pileup. The described breach position functions well on regular roads, but is more suited to three lane highways, where the extra spacing between lanes and generally wide shoulders can accommodate such a pattern safely, while keeping all of the vehicles on the roadway.

In addition to the breach position described above, the vehicles that are at the front of the platoon will be the last ones to brake. This will help prevent vehicles at the back of the platoon from colliding with the front vehicles and essentially create a "double whammy" in which the passengers suffer both front and rear end collisions almost simultaneously. This will also prevent further vehicle-vehicle crashes and limit damage to only the obstruction ahead. More specifically, the last row of the vehicles in the platoon will brake and acknowledge through V2V communications when they are successful in doing so, signaling the next row of the vehicles in front of the platoon to begin braking. In the case where V2V communications is not functioning correctly or fully, the vehicles will use a threshold time, which is the absolute maximum time they will wait before braking. This threshold time will be multiplied by a row weight, which will start from the back of the platoon at zero and progress successively forward for each row in the platoon to the front row of vehicles. This successive braking helps ensure the vehicles decelerate in a manner that will maintain their back-to-front spacing, and decrease the overall possibility of rear-end and front-end collisions.

Braking of the vehicles should be as smooth as possible with a sigmoidal control curve to apply the brake pressure. However in the case where the braking distance is less than the provided safe braking distance, brakes should be applied linearly and on all of the vehicles in the platoon at one time as a last resort to reduce the momentum of the platoon. If the distance is less than Table 1 below, then immediate synchronized braking should take place. The braking distance should be determined by the current jurisdiction's driver's handbook, or default to Table 1, assuming instant sensor perception and brake actuation. For the braking technique described above to be the most effective, it requires the vehicles of the same length to be in each row of the platoon, and trying to maximize the amount of width available for creating the tessellated pattern.

TABLE 1

| MPH | Braking distance (ft) |
|---|---|
| 20 | 25 |
| 30 | 57 |
| 40 | 101 |
| 50 | 158 |
| 60 | 227 |

The number of vehicles in the platoon should be such that the first and last vehicles in the platoon can communicate wirelessly with each other without any hops or repeaters in between, which would slow down the propagation of the signal. Each vehicle will through the use of sensors, such as cameras aided by computer vision, radar, Lidar and GPS, localize their index within the platoon, both in terms of the row that they are in relation from the back of the platoon, and the column they are in with the other vehicles in the neighboring lanes.

If there are vehicles of varying widths in the platoon, the strategy could include minimizing the amount of the "blocking" width of the vehicles in any one lane by combining large double wide vehicles in the same row with narrow vehicles such as "smart cars", and putting the wider vehicles in the row that is leading the turn for that row to take advantage of the turn.

Manufacturers of vehicles likely will program the height, width and length of their vehicles into each vehicle and the auxiliary vehicle protrusions, such as antennas, trim decorations and side-view mirrors with an extra six inches of margin for safety. These protrusions will be used to maintain the distance from other vehicles to protect the passengers and integrity of the vehicle. A more stringent primary bounding box is defined as the absolute boundary of the critical components of the vehicle, such as tires, engine block, cabin and other mechanical supports, are met during a heightened urgency stop. During an absolute worst case scenario stop a critical bounding box is defined as to not include things such as the crumple/impact zones of the vehicle using the last of the safety margin possible in distance.

If a total roadway obstruction, such as an emergency landed plane or an overturned truck, occurs in front of the platoon, the vehicles in the first row of the platoon all communicate with each other first, and come to a majority consensus that there is in fact a roadway obstruction ahead. These vehicles formulate a cryptographically signed message that contains certain information, for example, a current timestamp (most likely a Unix timestamp), distance to the obstruction, the temperature of the obstruction, the obstruction's orientation in terms of roadway blockage (is it blocking at an angle or straight across on all lanes), etc. The angle of the roadway blockage is important because extra leeway can be afforded to the vehicles that are traveling in that column, either in the form of decreased braking jerk or extra distance margins between the vehicles for safety. In one non-limiting embodiment, the leftmost vehicle in the front row will generate the message with the obstruction data, which can be referred to as the obstruction data packet that includes the data mentioned above sent over the V2V radio link to the vehicle to its right. The next vehicle will append its signature onto the packet, and then pass it on to the vehicle to its right until it reaches the end of the row. Then, the packet is broadcast from the rightmost vehicle to all of the vehicles in the platoon, officially activating the breach position steering and the braking strategy. All of the vehicles will turn simultaneously and synchronously upon receiving this activation packet.

It is important that the vehicles brake in a coordinated pattern to maximize the safety margin between the vehicles. The transmitted message should be a quick and short data packet sent over the V2V communications that describes the braking status, brake health, and the current G force exerted upon the vehicle in deceleration to the vehicles next to and in front of it, allowing them upon receiving the message to begin braking themselves, but limiting their braking strength so as to not overcome the one of the vehicle behind it. Braking should occur from the back to front of the platoon in all situations where there is enough braking distance for the initial row.

To account for obstructions that may be from hazardous materials transports, vehicles may be outfitted with infrared imagining technology or other temperature sensing technology that will be able to determine if the obstruction ahead is on fire. If so, the stopping point of the vehicles should be set back to prevent the front row of the vehicles from travelling into the potentially growing flames or being sprayed with potentially hazardous materials. The vehicles in the front row of the platoon should keep track of large trucks and transport vehicles ahead and either use V2V communications or computer vision to relay the contents on board the transport vehicle. If it is explosive, flammable or corrosive extra distance of 50 to 100 feet should be used as a safety margin when physically possible.

FIG. 1 is an illustration of a collision avoidance system 10 including a roadway 12 having three lanes, namely, a leftmost lane 44, a center lane 46 and a rightmost lane 48, defined by lane markers 16 and shoulder lines 18 also defining a shoulder 20. A platoon 22 of vehicles 24 is traveling along the lanes 44, 46 and 48 in a coordinated configuration, where the vehicles 24 are closely spaced together and are all traveling at the same speed in unison to gain greater fuel economy and a faster efficient travel. The vehicles 24 can be fully autonomously driven vehicles or semi-autonomously drive vehicles, but for this disclosure the speed, steering and orientation of the vehicles 24 are autonomously controlled while they are travelling in the platoon 22. In this non-limiting example, the platoon 22 includes three rows of three vehicles 24 in the lanes 44, 46 and 48, specifically a front row 26, a middle row 28 and a back row 30. Each vehicle 24 includes a V2V communications system 34 that can be any suitable communications system for the purposes described herein, where those systems are well understood by those skilled in the art. Each vehicle 24 also includes a suite of sensors 36 that detect and/or image objects, signs, markings, temperature, etc. around the vehicle 24, where the sensors 36 can be any suitable configuration of one or more of cameras, Lidar sensors, radar sensors, ultrasound sensors, etc. strategically configured on and around the vehicle 24. Each vehicle 24 also includes various vehicle systems 38, such as braking systems, steering systems, transmission, etc.

The communications system 34 receives, transmits and processes signals from the sensors 36 to identify objects and things around the vehicle 24 and their speed and direction, and receives, transmits and processes signals from the vehicle systems 38 on the vehicle 24 The communications system 34 broadcasts data packets and information as messages in a known manner it processes through an antenna 40 to the other vehicles 24 in the platoon 22 and receives the broadcast data packets and information as messages from the other vehicles 24 in the platoon 22, where the messages are suitably encrypted to prevent malicious attacks. For example, the V2V communications may employ an asymmetric key-pair that is used to authenticate messages transmitted between the vehicles 24 for security purposes. Therefore, each vehicle 24 in the platoon 22 can know what the other vehicles 24 in the platoon 22 are seeing and doing. As discussed above, and will be further discussed below, the system 10 shows how the vehicles 24 react to detecting an obstruction in the roadway 12, shown here as a stopped tour bus 42 extending across the roadway 12 in front of the platoon 22.

Figure 2:
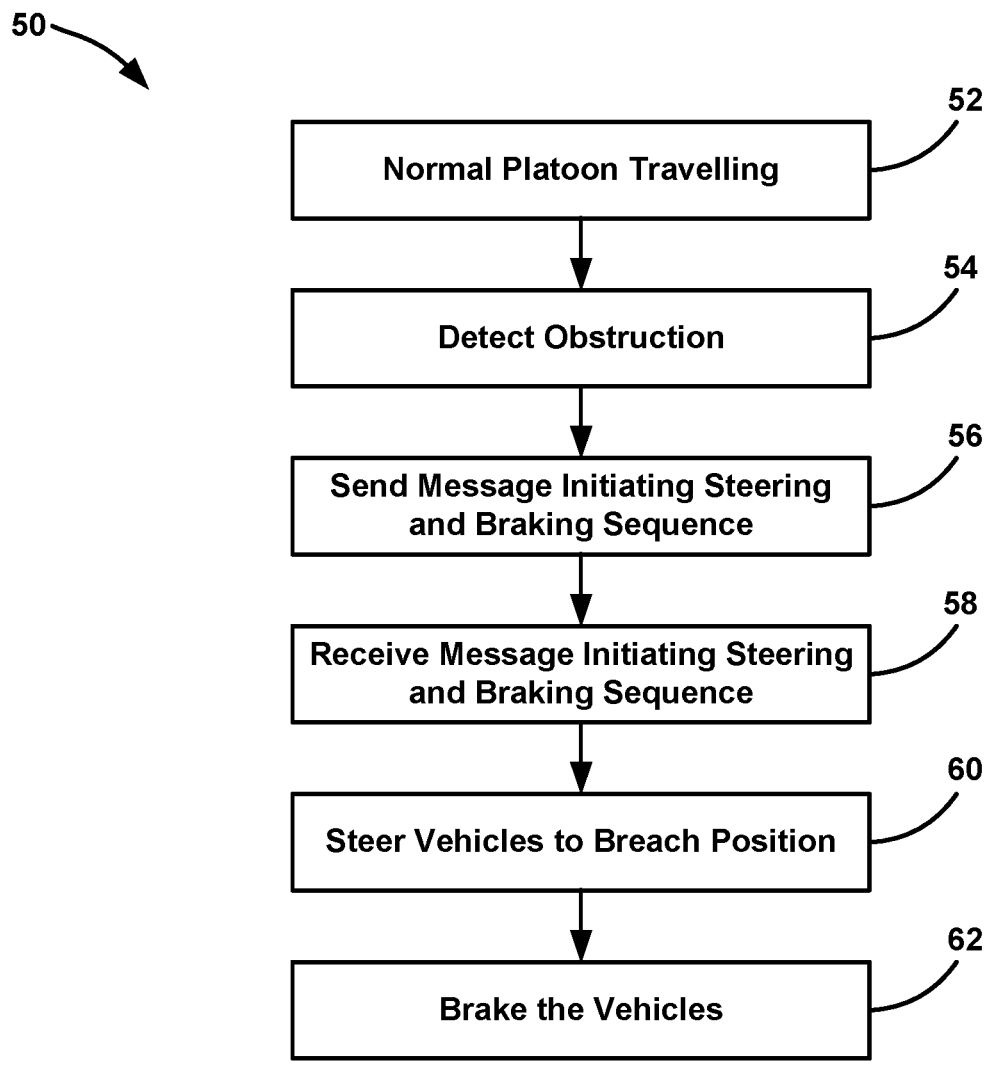
FIG. 2 is a flow chart diagram showing a process for steering and braking the platoon of vehicles shown in FIG. 1 in response to detecting an obstruction in the roadway.

FIG. 2 is a flow chart diagram 50 showing a process for braking the vehicles 24 in response to detecting the bus 42. At box 52, the vehicles 24 are travelling normally along the roadway 12 in coordination with each other in the platoon 22. At box 54, the vehicles 24 in the front row 26 determine that the bus 42 is in the roadway 12 in front of the platoon 22 and collision avoidance is required, and at box 56 a message is transmitted to the other vehicle 24 in the platoon 22 that includes information about the bus 42, such as distance, size, angle, temperature, etc. In one embodiment, the vehicle 24 in the leftmost lane 44 in the front row 26 will detect the bus 42 and generate an obstruction data packet that includes the obstruction data that is transmitted over the V2V radio link to the vehicle 24 in the center lane 46 in the front row 26. If that vehicle 24 also detects the bus 42 it will append its signature onto the packet, and then pass it on to the vehicle 24 in the rightmost lane 48 in the front row 26. If the vehicle 24 in the rightmost lane 48 also detects the bus 42, it will append it signature to the packet, and since all of the vehicles 24 in the front row 26 agree the bus 42 is in the way, the vehicle 24 in the rightmost lane 48 in the row 26 will broadcast the message with the obstruction data packet to all of the vehicles 24 in the platoon 22.

Figure 3:
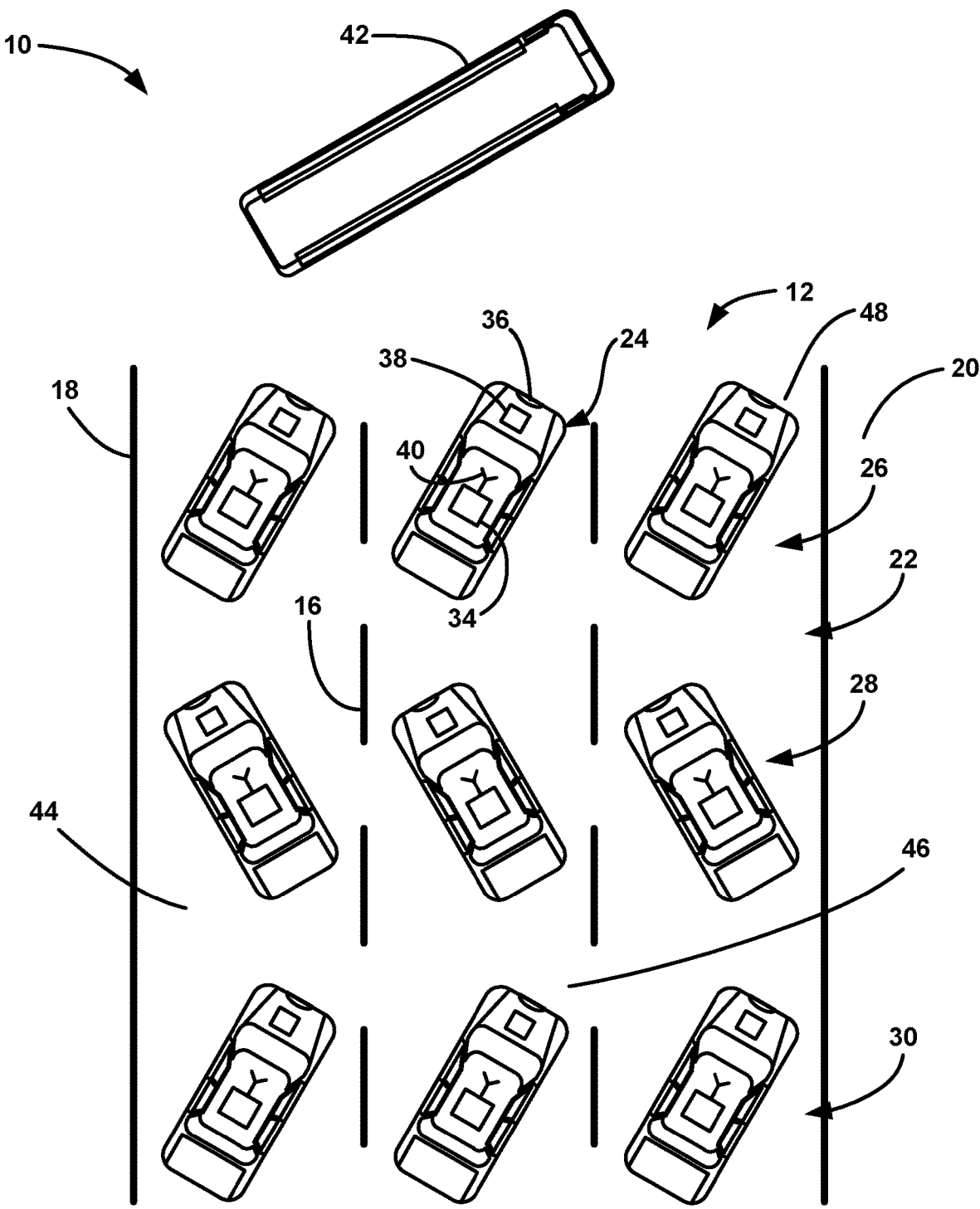
FIG. 3 is an illustration of the platoon of vehicles shown in FIG. 1 steering towards a breach position in response to detecting the obstruction in the roadway.
Figure 4:
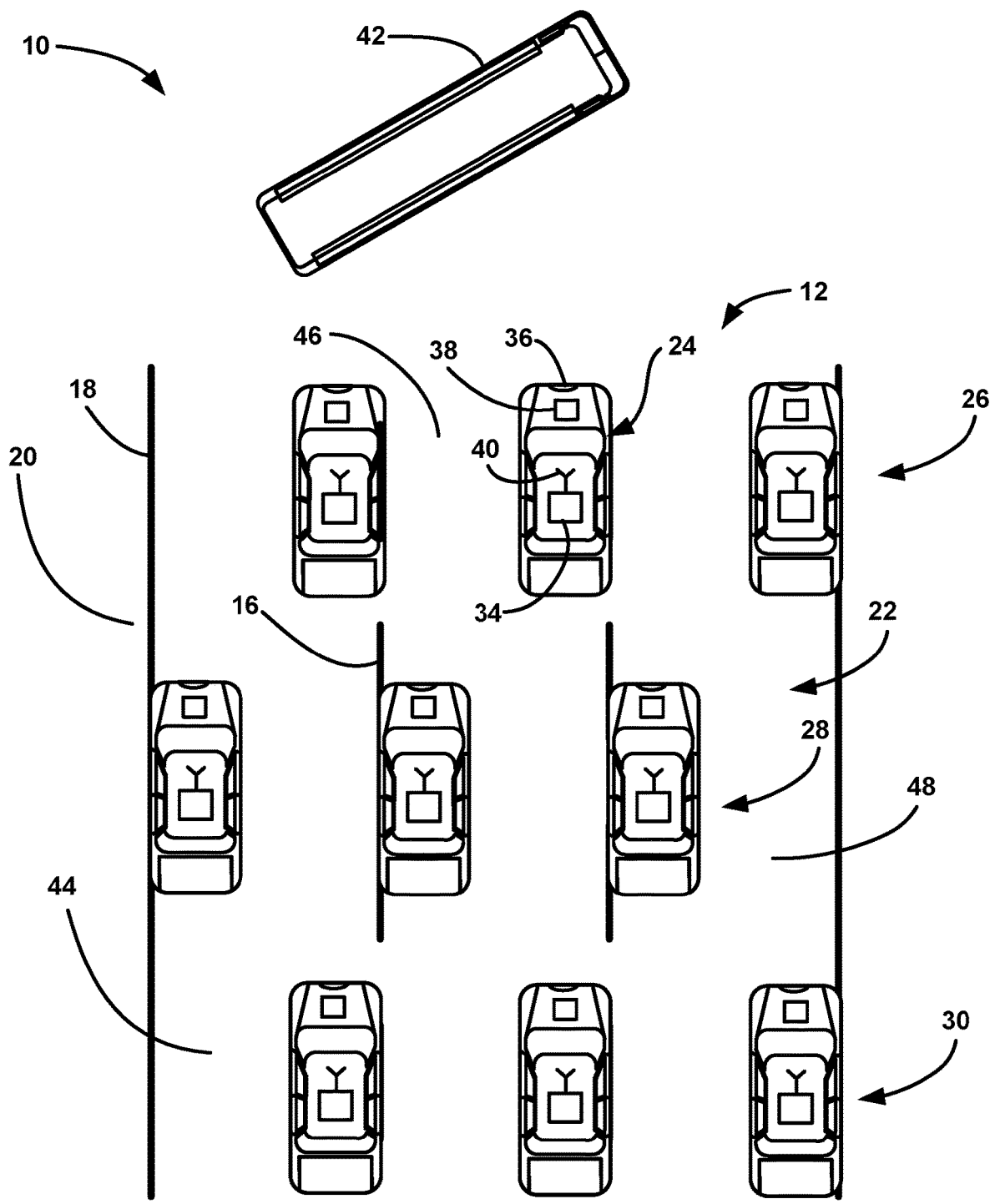
FIG. 4 is an illustration of the platoon of vehicles shown in FIG. 1 in the breach position in response to detecting the obstruction in the roadway.

The other vehicles 24 in the platoon 22 receive the message at box 58, which causes the steering and braking strategy to be initiated that prevents collisions among the vehicles 24 and with the bus 42. Specifically, the vehicles 24 simultaneously turn in a coordinated alternating and opposite manner at box 60 as shown in FIG. 3 to steer the vehicle 24 towards the lane marker 16 or the line 18 relative to the lane 44, 46 or 48 that the vehicle 24 is travelling in, where the vehicles 24 already know what direction they will turn based on what row 26, 28 or 30 they are in. Specifically, the vehicles 24 steer into the tessellated pattern and breach position shown in FIG. 4, where once the vehicles 24 are in this position a next vehicle 24 directly in front of most of the vehicles 24 is two rows up, which gives more braking distance to reduce the chance of a collision. At the same time that the vehicles 24 are steering to the breach position, a braking protocol is initiated at box 62 consistent with the discussion herein, where the ABS system on the vehicles 24 allows the vehicles 24 to be steered and braked at the same time. For example, if there is enough time and braking distance, the braking is coordinated so that the vehicles 24 in the last row 30 will brake first, the vehicles 24 in the middle row 28 will brake next and the vehicles 24 in the front row 26 will brake following that. If there is limited braking distance, then all of the vehicles 24 may brake at the same time. Once the vehicles 24 are in the breach position, they will continue to brake until they stop.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for steering and braking a plurality vehicles traveling in a platoon in response to detecting an obstruction in front of the platoon, where the vehicles are equipped with V2V communications, said method comprising:
    causing the vehicles to travel in a platoon configuration where the vehicles are arranged so that at least two vehicles travel in parallel travel lanes as a row, where there is a plurality of rows of vehicles and where vehicles traveling in a particular travel lane travel right behind each other, wherein the size of the platoon is small enough so that any message transmitted by one vehicle in the platoon will be directly received by all of the vehicles in the platoon;
    detecting the obstruction by at least one of the vehicles in a front row of the platoon;
    coordinating and verifying between the vehicles in the front row that the obstruction is in front of the platoon, wherein detecting the obstruction and coordinating and verifying between the vehicles in the front row includes detecting the obstruction by a leftmost vehicle in the front row, generating an obstruction data packet that includes obstruction data that is transmitted to a receiving vehicle to its right in the front row, appending a signature of the receiving vehicle onto the data packet, and transmitting the data packet to the vehicle to its right towards the end of the row that appends its signature to the data packet, and wherein the obstruction data includes a temperature of the obstruction;
    broadcasting a message from one of the vehicles in the front row to the other vehicles in the platoon behind the front row that a coordinated braking and steering operation will occur to prevent a collision with the obstruction;
    causing the vehicles in each row to steer in one direction to one side of the travel lane the vehicle is in such that the vehicles in alternating rows steer in opposite directions to an opposite side of the travel lane the vehicle is in so that the vehicles in the alternating rows proceed to opposite sides of the travel lane from each other and not directly behind each other; and
    causing the vehicles to brake so that all of the vehicles stop at the sides of the lanes.

2. The method according to claim 1 wherein the obstruction data includes a current timestamp, distance to the obstruction and an angle of the obstruction.

3. The method according to claim 1 wherein the obstruction data includes whether the obstruction is carrying hazardous materials.

4. The method according to claim 1 wherein causing the vehicles to brake includes first braking the vehicles in a last row of the platoon, then braking the vehicles in a next to last row of the platoon and braking the vehicles in the front row.

5. The method according to claim 1 wherein causing the vehicles to brake includes braking all of the vehicles simultaneously.

6. The method according to claim 1 wherein causing the vehicles to brake includes causing the vehicles to brake at the same time they are being steered.

7. The method according to claim 1 wherein the number of travel lanes is three travel lanes.

8. The method according to claim 1 further comprising positioning the vehicles in a particular row based on a size of the vehicle.

9. A method for steering and braking a plurality vehicles traveling in a platoon in response to detecting an obstruction in front of the platoon, where the vehicles are equipped with V2V communications and where the vehicles are travelling along a three-lane roadway, said method comprising:
    causing the vehicles to travel in a platoon configuration where the vehicles are arranged so that three vehicles travel in the lanes in a plurality of rows, where vehicles traveling in a particular travel lane travel right behind each other, wherein the size of the platoon is small enough so that any message transmitted by one vehicle in the platoon will be directly received by all of the vehicles in the platoon;
    detecting the obstruction by a vehicle in a front row travelling in a leftmost lane, generating an obstruction data packet that includes obstruction data that is transmitted to a vehicle travelling in a center lane in the front row, appending a signature of the vehicle travelling in the center lane onto the data packet, and transmitting the data packet to a vehicle travelling in a rightmost lane in the front row that appends its signature to the data packet, wherein the obstruction data includes a temperature of the obstruction;

broadcasting a message including the obstruction data packet from the vehicle travelling in the rightmost lane in the front row to the other vehicles in the platoon behind the front row that a coordinated braking and steering operation will occur to prevent a collision with the obstruction;

causing the vehicles in each row to steer in one direction to one side of the travel lane the vehicle is in such that the vehicles in alternating rows steer in opposite directions to an opposite side of the travel lane the vehicle is in so that the vehicles in the alternating rows proceed to opposite sides of the travel lane from each other and not directly behind each other in a breach position; and causing the vehicles to brake at the same time they are being steered so that all of the vehicles stop at the sides of the lanes.

10. The method according to claim 9 wherein the obstruction data includes a current timestamp, distance to the obstruction and an angle of the obstruction.

11. The method according to claim 9 wherein the obstruction data includes whether the obstruction is carrying hazardous materials.

12. The method according to claim 9 wherein causing the vehicles to brake includes first braking the vehicles in a last row of the platoon, then braking the vehicles in a next to last row of the platoon and braking the vehicles in the front row.

13. The method according to claim 9 wherein causing the vehicles to brake includes braking all of the vehicles simultaneously.

14. A system for steering and braking a plurality vehicles traveling in a platoon in response to detecting an obstruction in front of the platoon, where the vehicles are equipped with V2V communications, said system comprising:

means for causing the vehicles to travel in a platoon configuration where the vehicles are arranged so that at least two vehicles travel in parallel travel lanes as a row, where there is a plurality of rows of vehicles and where vehicles traveling in a particular travel lane travel right behind each other, wherein the size of the platoon is small enough so that any message transmitted by one vehicle in the platoon will be directly received by all of the vehicles in the platoon;

means for detecting the obstruction by at least one of the vehicles in a front row of the platoon;

means for coordinating and verifying between the vehicles in the front row that the obstruction is in front of the platoon, wherein the means for detecting the obstruction and the means for coordinating and verifying between the vehicles in the front row detect the obstruction by a leftmost vehicle in the front row, generate an obstruction data packet that includes obstruction data that is transmitted to a receiving vehicle to its right in the front row, append a signature of the receiving vehicle onto the data packet, and transmit the data packet to the vehicle to its right towards the end of the row that appends its signature to the data packet, wherein the obstruction data includes a temperature of the obstruction;

means for broadcasting a message from one of the vehicles in the front row to the other vehicles in the platoon behind the front row that a coordinated braking and steering operation will occur to prevent a collision with the obstruction;

means for causing the vehicles in each row to steer in one direction to one side of the travel lane the vehicle is in such that the vehicles in alternating rows steer in opposite directions to an opposite side of the travel lane the vehicle is in so that the vehicles in the alternating rows proceed to opposite sides of the travel lane from each other and not directly behind each other; and means for causing the vehicles to brake so that all of the vehicles stop at the sides of the lanes.

15. The system according to claim 14 wherein the means for causing the vehicles to brake first brakes the vehicles in a last row of the platoon, then brakes the vehicles in a next to last row of the platoon and braking the vehicles in the front row.

* * * * *